US007116855B2

(12) United States Patent
Yang et al.

(10) Patent No.: US 7,116,855 B2
(45) Date of Patent: Oct. 3, 2006

(54) OPTICAL SHUTTLE SYSTEM AND METHOD USED IN AN OPTICAL SWITCH

(75) Inventors: Fuqian Yang, Lexington, KY (US); Joel A. Kubby, Rochester, NY (US); Alex T. Tran, Clifton Park, NY (US); Jun Ma, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 113 days.

(21) Appl. No.: 10/879,094

(22) Filed: Jun. 30, 2004

(65) Prior Publication Data

US 2006/0002652 A1    Jan. 5, 2006

(51) Int. Cl.
*G02B 6/35* (2006.01)
(52) U.S. Cl. ....................................................... 385/16
(58) Field of Classification Search ............. 385/16–23
See application file for complete search history.

(56) References Cited

U.S. PATENT DOCUMENTS

| | | | | |
|---|---|---|---|---|
| 5,024,500 A * | 6/1991 | Stanley et al. ................. | 385/16 |
| 5,612,815 A * | 3/1997 | Labeye et al. ................ | 359/320 |
| 5,828,800 A * | 10/1998 | Henry et al. ................... | 385/20 |
| 6,169,826 B1 * | 1/2001 | Nishiyama et al. ............ | 385/22 |
| 6,463,190 B1 * | 10/2002 | Kato et al. ..................... | 385/16 |
| 6,487,330 B1 * | 11/2002 | Horino et al. ................. | 385/16 |
| 6,832,016 B1 * | 12/2004 | Steinberg et al. .............. | 385/20 |
| 6,836,583 B1 * | 12/2004 | Hsu et al. ...................... | 385/16 |
| 6,853,765 B1 * | 2/2005 | Cochran ........................ | 385/23 |
| 6,898,342 B1 * | 5/2005 | Sprague et al. ................ | 385/20 |
| 6,968,100 B1 * | 11/2005 | Kubby et al. .................. | 385/16 |
| 7,054,519 B1 * | 5/2006 | Novotny ........................ | 385/16 |
| 2004/0027029 A1 * | 2/2004 | Borwick et al. ............. | 310/309 |
| 2004/0118481 A1 * | 6/2004 | Kubby et al. ................ | 148/101 |
| 2004/0190818 A1 * | 9/2004 | Telkamp et al. .............. | 385/22 |
| 2004/0264848 A1 * | 12/2004 | Lee et al. ...................... | 385/22 |

* cited by examiner

*Primary Examiner*—Michelle Connelly-Cushwa
(74) *Attorney, Agent, or Firm*—Oliff & Berridge, PLC (57) ABSTRACT

An optical shuttle system for routing signals in a communications system that includes a terminal connected to a power source, a shuttle that includes waveguides used for routing the signals, and a beam connected to the terminal and the shuttle so that the beam suspends the shuttle. When power from the power source is applied to the terminal, the beam drives a movement of the shuttle. Furthermore, a method of using an optical shuttle system for routing signals in a communications system, the method includes connecting a terminal to a power source, connecting a shuttle to a beam to suspend the shuttle, and applying power from the power source to the terminal so that the beam drives a movement of the shuttle in a direction substantially perpendicular to a direction of the beam.

14 Claims, 8 Drawing Sheets

OPTICAL SHUTTLE SYSTEM AND METHOD USED IN AN OPTICAL SWITCH

BACKGROUND OF THE INVENTION

1. Field of Invention

This invention relates to optical communications systems. More specifically, the systems and methods of the invention relate to an optical shuttle system that may be used in an optical switch within the optical communications systems.

2. Description of Related Art

Modern communication systems include optical communications systems that may utilize large amounts of bandwidth. In order to improve efficiency, many optical communications systems utilize optical switches. The optical switches may add or drop input signals from a fiber optic source to a different fiber optic output port sometimes using micro-electromechanical (MEMS) technology-based optical multiplexers. The optical switches may also include both a shuttle mechanism that holds a routing waveguide structure, and an actuator that physically moves the shuttle mechanism.

Conventional optical switches typically use separate components for the optical switch and the optical switch actuator. Moreover, the conventional shuttle mechanisms use thermally operated actuators to control the switching function within the optical communications systems. For example, when the shuttle mechanism forms the switching element, the thermal actuators are thermally driven to cause the shuttle mechanism to move between switching positions. However, this configuration requires that the thermal actuators overcome both a restoring force of the suspension arms of the shuttle mechanism, and the thermal actuator itself. Thus, high actuation forces and long displacement distances are required in order to adequately drive the shuttle mechanism. As a result, the high actuation forces demand a high power consumption, and the long displacement distances require that long thermal actuators be used with optical switch. Accordingly, increased space within the switching system is required which can subsequently cause an increased tendency toward out of plane deformation within the optical switch.

SUMMARY OF THE INVENTION

Based on the problems discussed above, there is a need for an improved optical shuttle system within an optical switch that will not consume large amounts of power and will allow a reduction in space constraints within an optical communications system.

In accordance with various exemplary embodiments of the invention, an optical switch embeds an optical shuttle system into an integrated actuator with a latching mechanism. The optical switch can be formed using MEMS microfabrication techniques.

In various exemplary embodiments, an optical shuttle system for routing signals in a communications system includes a terminal that is connected to a power source, a shuttle that includes waveguides used for routing the signals, and a beam connected to the terminal and the shuttle so that the beam suspends the shuttle. When power from the power source is applied to the terminal, the beam drives a movement of the shuttle.

In various exemplary alternative embodiments, a method of using an optical shuttle system for routing signals in a communications system includes connecting a terminal to a power source, connecting a shuttle to a beam to suspend the shuttle, and applying power from the power source to the terminal so that the beam drives a movement of the shuttle in a direction substantially perpendicular to a direction of the beam.

The long displacement distances discussed above are not required to adequately drive the optical shuttle system because thermal actuation is used to drive the shuttle (rather than electrostatically operated actuators), and the shuttle is embedded into the beams acting as integrated thermal actuators. For example, only the actuator and shuttle are used to drive the switching action without the need for electrostatically operated actuators. Because thermal actuation imparts a higher force than electrostatically operated actuators, the combined beams and shuttle within the optical shuttle system in accordance with the invention may increase part reliability and reduce power consumption.

In various exemplary alternative embodiments, the optical shuttle system may be used with a latching mechanism.

In various exemplary alternative embodiments, the thermal actuators may be pre-shaped beams that are used to drive the optical shuttle system. The shuttle may include an optical component, such as optical waveguides. When power, i.e., electric current is applied to the optical shuttle system, the electric current passes through the beams causing the beams to thermally expand. The thermal expansion within the beams causes the shuttle of the optical shuttle system to be driven to a predetermined location. When the shuttle reaches the predetermined location, a group of thermal actuators may latch the shuttle. The thermal actuators that latch the shuttle may then be reheated using the electric current to release the shuttle, which will subsequently cause the shuttle to be driven back to its original position under a restoring force of the beam actuators.

BRIEF DESCRIPTION OF THE DRAWINGS

Various exemplary embodiments of the systems and methods according to the invention will be described in detail, with reference to the following figures, wherein.

DETAILED DESCRIPTION OF EXEMPLARY EMBODIMENTS

The invention relates generally to systems and methods of an optical switch that includes an optical shuttle system that is used in the optical communications systems. For reasons of convenience, the embodiments of the invention will be discussed using the optical switch in conjunction with an optical add/drop multiplexer within the optical communications system. However, it should be appreciated by one skilled in the art that the systems and methods of the invention can be used with any part of an optical communications system without departing from the sprit and scope of the invention.

Figure 1:
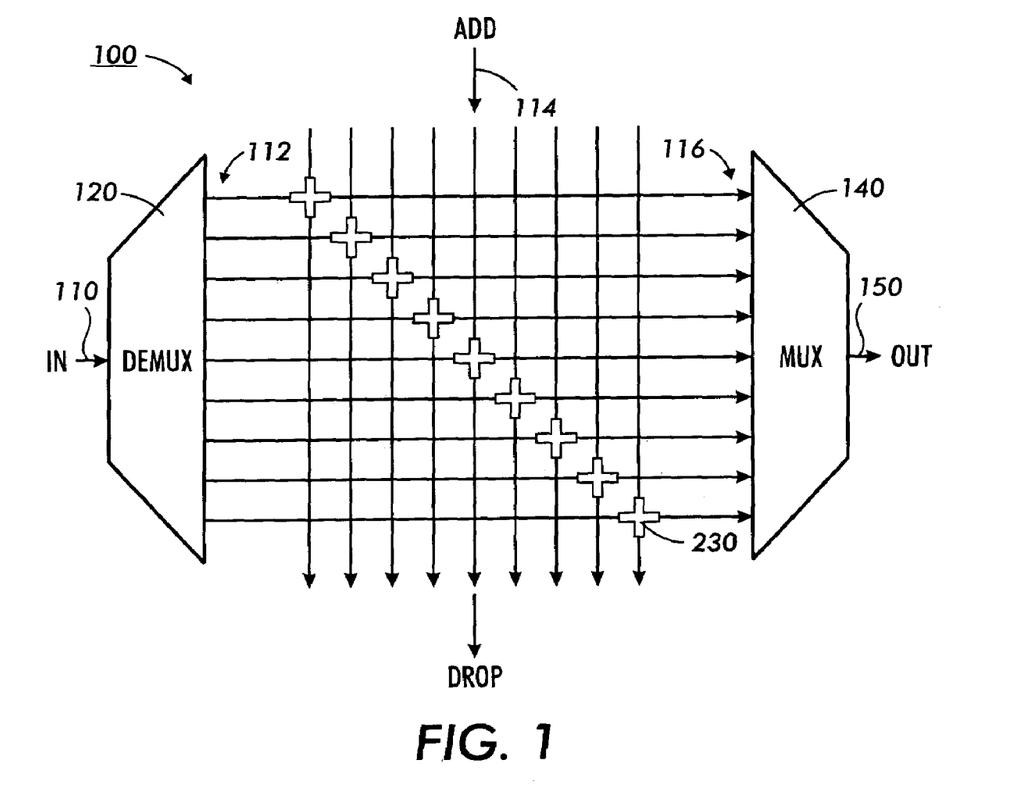
FIG. 1 is an exemplary diagram of an optical communications system.

FIG. 1 is an exemplary diagram of an optical communications system. In various exemplary embodiments, the optical communication system may be an optical add/drop multiplexer 100. As shown in FIG. 1, the optical add/drop multiplexer 100 may receive an input optical signal 110 with many optical channels at different wavelengths from a single optical fiber. The input optical signal 110 is demultiplexed by demultiplexer 120 into separate optical channels 112 based on the wavelengths of the optical channels 112. Once the input optical signal 110 is demultiplexed, each of the separate optical channels 112 encounters one of a plurality of optical switches 230. The optical switches 230 may either pass or drop out the respective one of the optical channels 112. For any of the optical channels 112 that are dropped, a new signal 114 may be added by the optical switches 230 to further utilize that channel. Channels 116 that are passed or added by the optical switches 230 are remultiplexed by a multiplexer 140 into an output optical signal 150 and output to another single optical fiber. Because the channels may be dropped and added by the optical add/drop multiplexer 100, the output optical signal 150 may include a modified data stream as compared to the input optical signal 110.

Figure 2:
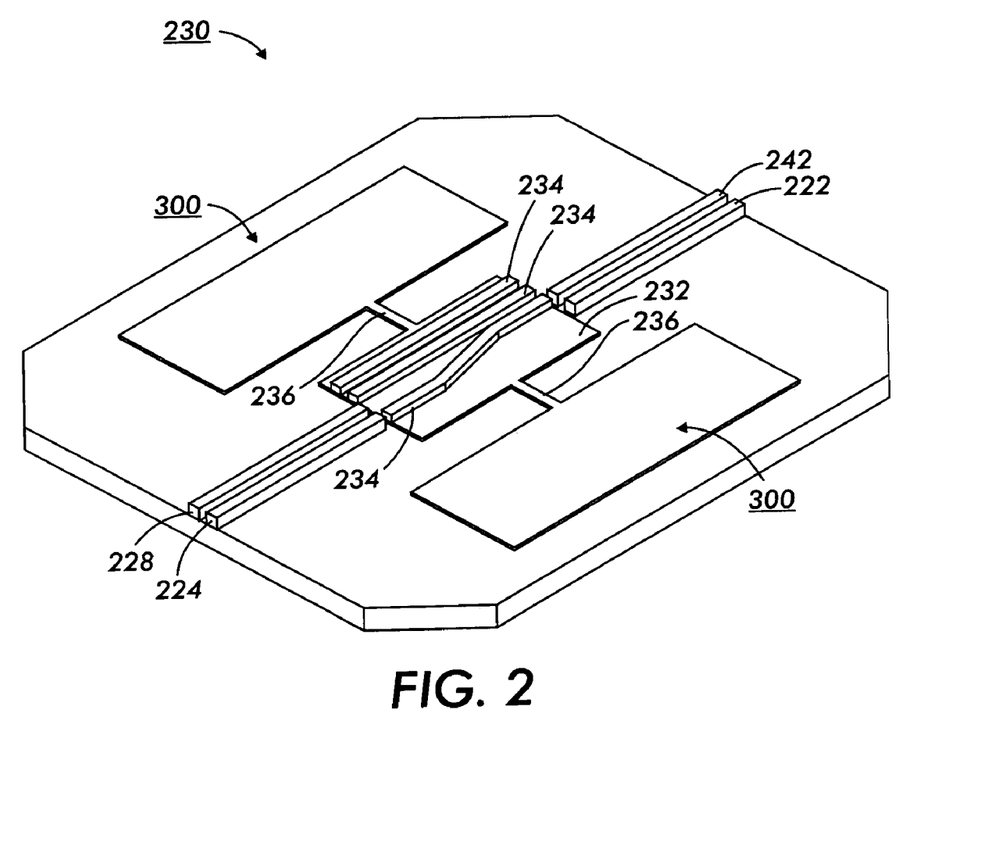
FIG. 2 is an exemplary diagram of an optical switch that may be used within the optical communications system of FIG. 1.

FIG. 2 is an exemplary diagram of an optical switch 230 that may be used within the optical communications system shown in FIG. 1. As shown in FIG. 2, the optical switch 230 may be used as a waveguide switch or optical changeover switch. The optical switch 230 includes a shuttle 232 with a plurality of waveguides 234. An input waveguide 222 corresponding to one of the channels 112 from the optical add/drop multiplexer 100 and a waveguide 242 for carrying the new signal 114 to be added are disposed on one of the waveguides 234. Similarly, an output waveguide 224 corresponding to one of the channels 116 of the optical add/drop multiplexer 100 and a waveguide 228 for dropping a signal are situated at the other end of the waveguides 234.

As indicated by the arrows in FIG. 2, the shuttle 232 may be driven or moved transversely by a pair of actuators 236. The actuators 236 may be of any suitable type, such as, for example, a thermal actuator, electrostatic actuator, magnetic actuator or piezoelectric actuator. The waveguides 234 are configured so that the transverse movement of the shuttle 232 will switch between one of the waveguides 234 connecting the input waveguide 222 to the output waveguide 224 and one of the waveguides 234 connecting the waveguide 242 carrying the new signal 114 to the output waveguide 224. To drop the signal of the input waveguide 222, one of the waveguides 234 can connect to the input waveguide 222 to the waveguide 228.

Figure 3:
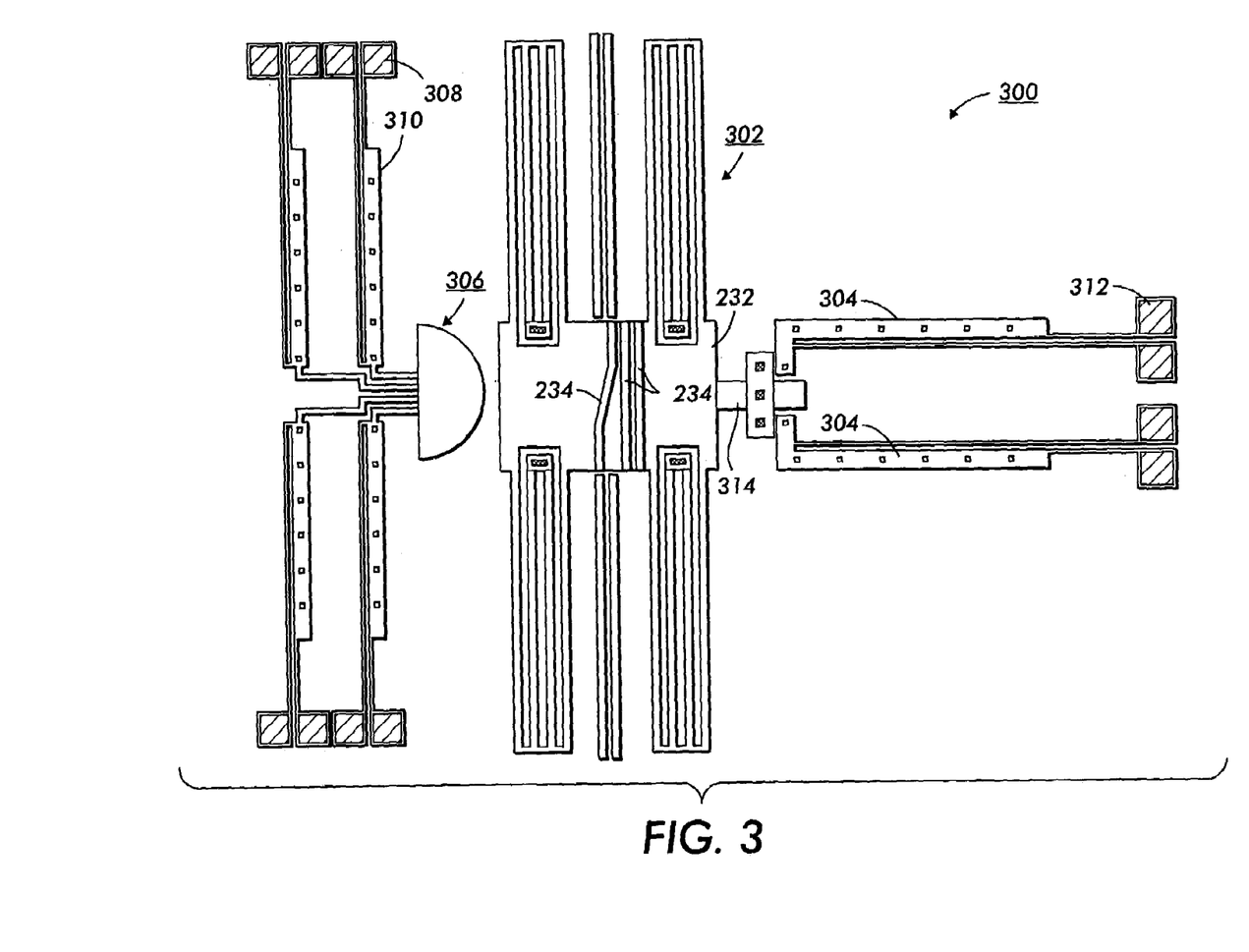
FIG. 3 is an exemplary diagram of a conventional optical shuttle device and actuators that may be used in the optical communications system of FIG. 1.

FIG. 3 is an exemplary diagram of a conventional optical shuttle device 300 that may be used with the optical switch 230 shown in FIG. 2. As shown in FIG. 3, the optical shuttle device 300 includes thermal actuators 310 that have a stiffness, an actuator head 306 and springs 302. The actuator head 306 is connected to the thermal actuators 310. The springs 302 are connected to the shuttle 232 and are also fastened to the optical switch 230 (shown in FIG. 2). The springs 302 have a resistance or stiffness, and thus suspend the shuttle 232 so that it can be properly guided when driven.

The optical shuttle device 300 also includes electric terminals 308 that are connected to the thermal actuators 310. The optical shuttle device 300 also includes latch heatuators 304 that are connected to electric terminals 312.

The optical shuttle device 300 in FIG. 3 is in a non-latched position whereby no power has been applied to the electric terminals 308 and the thermal actuators 310 are not displaced from a retracted position or an equilibrium position. Furthermore, the actuator head 306 does not contact the shuttle 232. However, when power is applied to the electric terminals 308, thermal expansion occurs in the thermal actuators 310 causing the thermal actuators 310 to be displaced from their retracted position. When the thermal actuators 310 are displaced, the actuator head 306 contacts the shuttle 232 and drives the shuttle 232 from an unlatched position (shown in FIG. 3) to a latched position (shown in FIG. 4). Because the shuttle 232 includes the optical component with the waveguides 234, the optical shuttle device 300 functions as a switch when it is driven by the actuator head 306 by controlling the waveguides 234 on the shuttle 232 to align with the various waveguides within the optical add/drop multiplexer 100. This function controls the direction of optical signals within the optical communications system.

Figure 4:
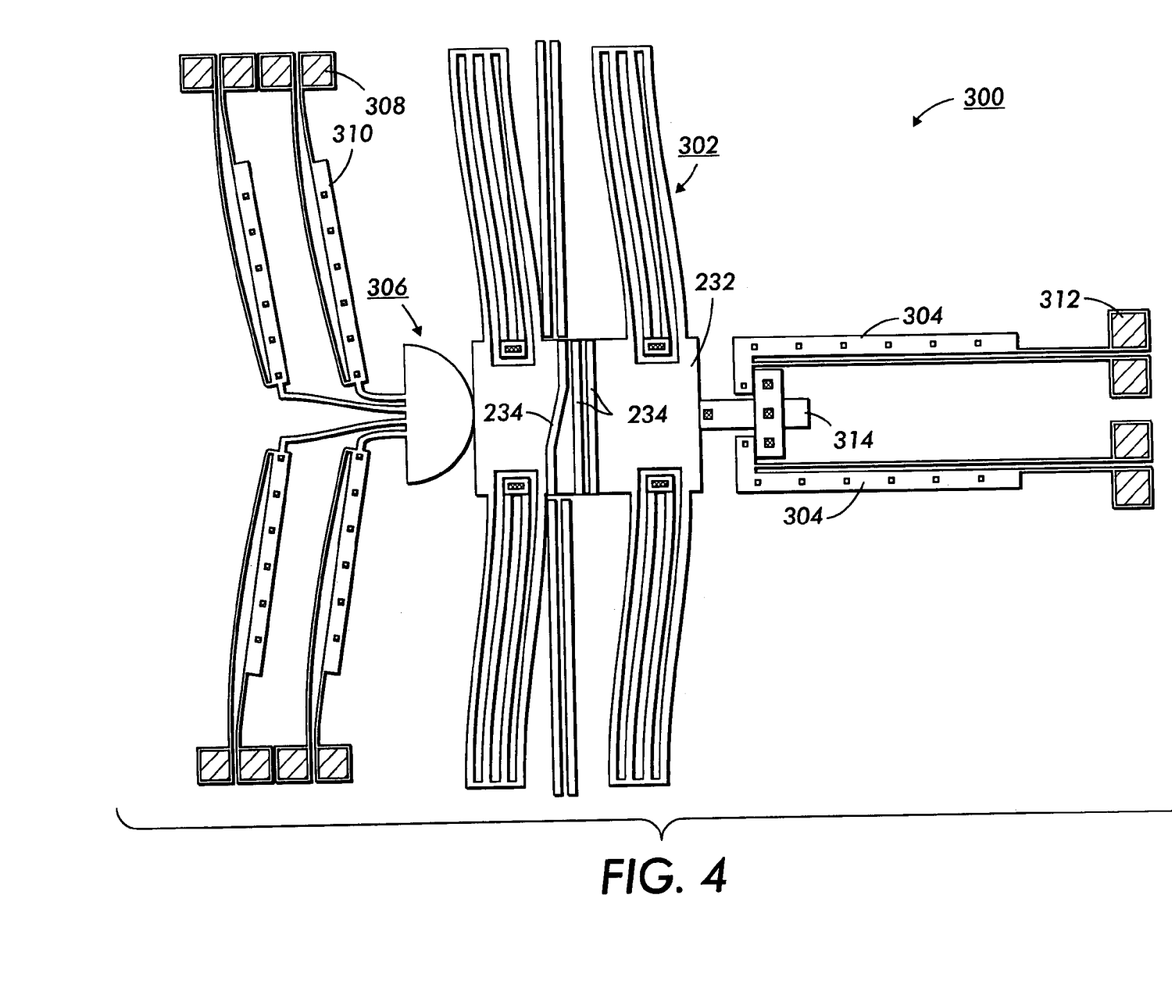
FIG. 4 is an exemplary diagram of the conventional optical shuttle device and actuators in FIG. 3 in a displaced position.

FIG. 4 is an exemplary diagram of the conventional optical shuttle device 300 in FIG. 3 in a displaced position. As shown in FIG. 4, after power has been applied to the electric terminals 308, the thermal actuators 310 are displaced so that the actuator head 306 contacts the shuttle 232. Because the thermal actuators 310 are displaced out of there equilibrium position, the stiffness (or resistance) that creates a restoring force in the thermal actuators 310 is overcome to displace the shuttle 232. Furthermore, the springs 302 are also folded and displaced as shown in FIG. 4 so that the movement of the shuttle 232 overcomes a restoring force in the springs 302. The folded springs 302 also supply a restoring force to return the shuttle 232 back to its equilibrium position. Once the shuttle 232 is driven to the predetermined position, the shuttle 232 is latched in place by applying power to the electric terminals 312 which causes the latch heatuators 304 to activate a latch 314 to hold the shuttle 232 in the predetermined position.

The optical shuttle device 300 is returned to its equilibrium position by removing the power from the electric terminals 312 so that the restoring force in the springs 302 and the thermal actuators 310 is overcome. Thus, the optical shuttle device 300 returns to the position shown in FIG. 3.

Figure 5:
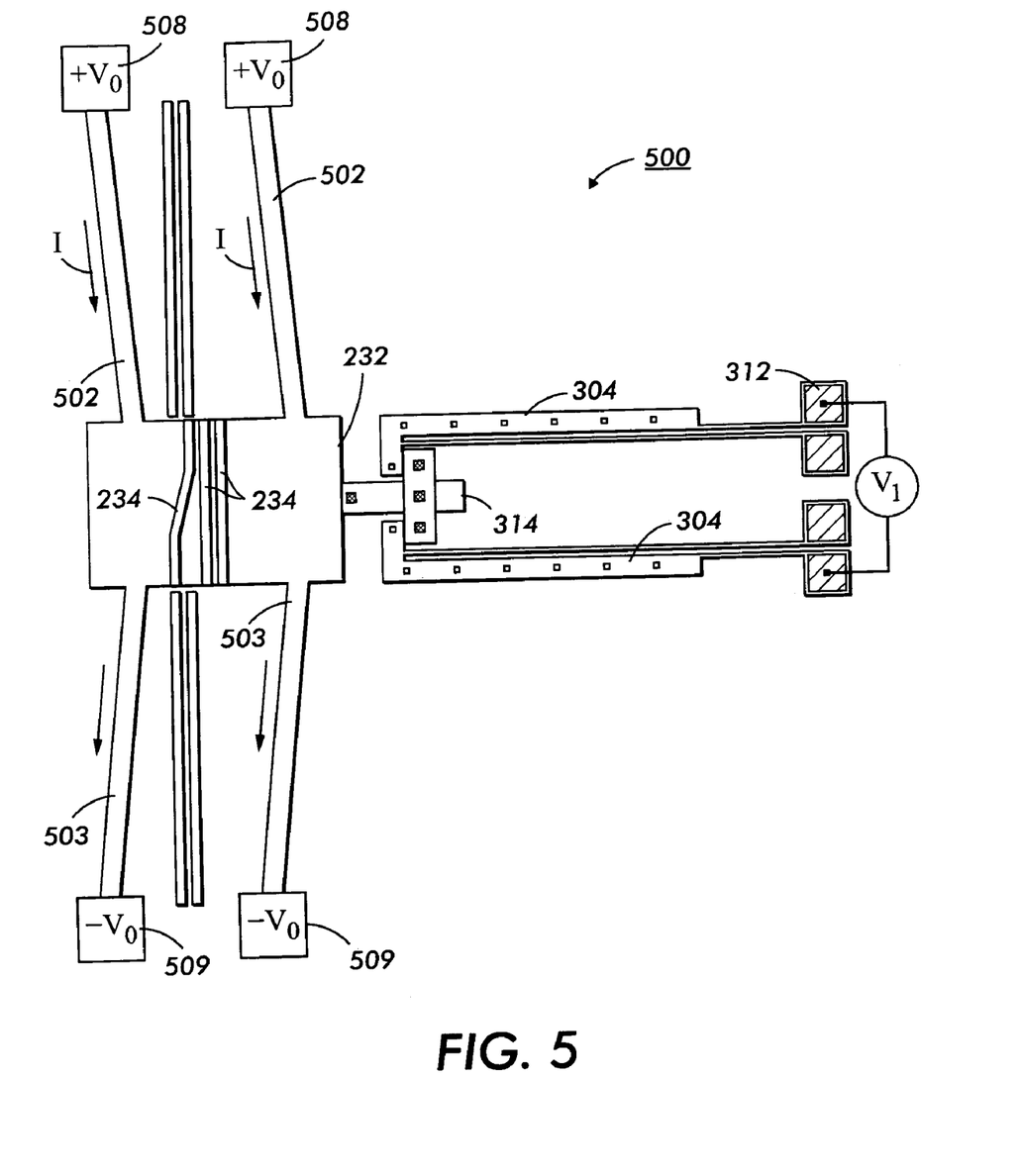
FIG. 5 is an exemplary diagram of a first embodiment of the optical shuttle system used in accordance with the invention.

FIG. 5 is an exemplary diagram of a first embodiment of the optical shuttle system 500 used in accordance with the invention. The optical shuttle system 500 may be formed on a specific location of a silicon chip. As shown in FIG. 5, two beams 502 are connected to electric terminals 508 and to the shuttle 232, and two other beams 503 are connected to electric terminals 509 and to the shuttle 232. The beams 502 and 503 are anchored to the electric terminals 508 and 509 and the shuttle 232. The beams 502 and 503 may also be pre-shaped and may be composed of silicon to provide a stiffness in the beams 502 and 503. If silicon is used to form the beams 502 and 503, dopants may be used to dope the silicon beams and increase conductivity of the beams 502 and 503.

The electric terminals 508 are configured to be positive electric terminals and the electric terminals 509 are configured to be negative electric terminals. When power, i.e. voltage, is applied to the electric terminals 508 and 509, the electric current I travels from the electric terminals 508, through the beams 502 and 503 and to the electric terminals 509. The current I causes thermal expansion to occur in the beams 502 and 503 which results in a force that drives the shuttle 232 (and the waveguides 234) to a predetermined position. Once the shuttle 232 is driven to the predetermined position, the shuttle 232 is latched in place by applying power to the electric terminals 312 which causes the thermal actuators 304 to activate a latch 314 to hold the shuttle 232 in the predetermined position. The latch 314 can hold the shuttle 232 in a non-equilibrium position even when the electric power is removed from the electric terminals 312. The optical shuttle system 500 may be returned to its equilibrium position by reapplying the electric power to the electric terminals 312 so that the latch 314 releases the shuttle 232 and the restoring force in the beams 502 and 503 returns to shuttle 232 to its unlatched position.

Figure 6:
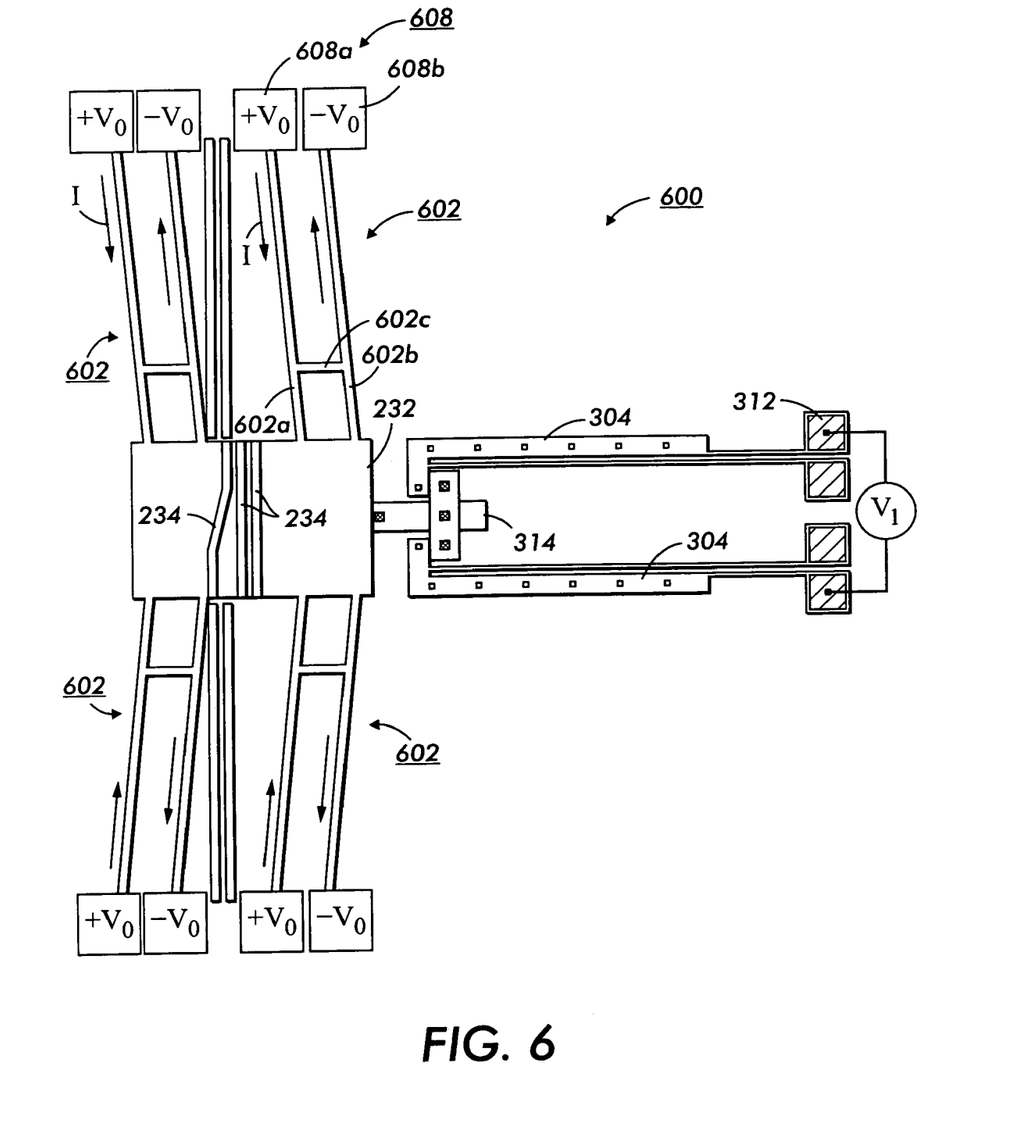
FIG. 6 is an exemplary diagram of a second embodiment of the optical shuttle system used in accordance with the invention.

FIG. 6 is an exemplary diagram of a second embodiment of the optical shuttle system used in accordance with the invention. As shown in FIG. 6, the optical shuttle system includes beam pairs 602 having first beams 602a and second beams 602b that are connected together by links 602c at a position between the electric terminals 608 and the shuttle 232. The beam pairs 602 are also connected to the electric terminals 608 and the shuttle 232. The electric terminals 608 include first and second electric terminals 608a and 608b for respective beams 602a and 602b within each of the beam pairs 602. As discussed above with the first embodiment, the first and second beams 602a and 602b (and the link 602c) within the beam pairs 602 can be pre-shaped and can be composed of silicon. Each group of electric terminals 608a and 608b may be configured so that the first electric pad 608a is a positive electric terminal and the second electric pad 608b is a negative electric terminal. Accordingly, when power is applied to the beam pairs 602 via the electric terminals 608a and 608b, electric current I travels toward the shuttle 232 in the first beam 602a, through the links 602c and then through the second beam 602b away from the shuttle to return to the second electric terminals 608b. As a result of thermal expansion in the beam pairs 602, the beam pairs 602 drive the shuttle 232 to a predetermined position. Once the shuttle 232 is driven to the predetermined position, the shuttle 232 may be latched in place and subsequently returned to its equilibrium position using the process discussed in FIG. 5.

Figure 7:
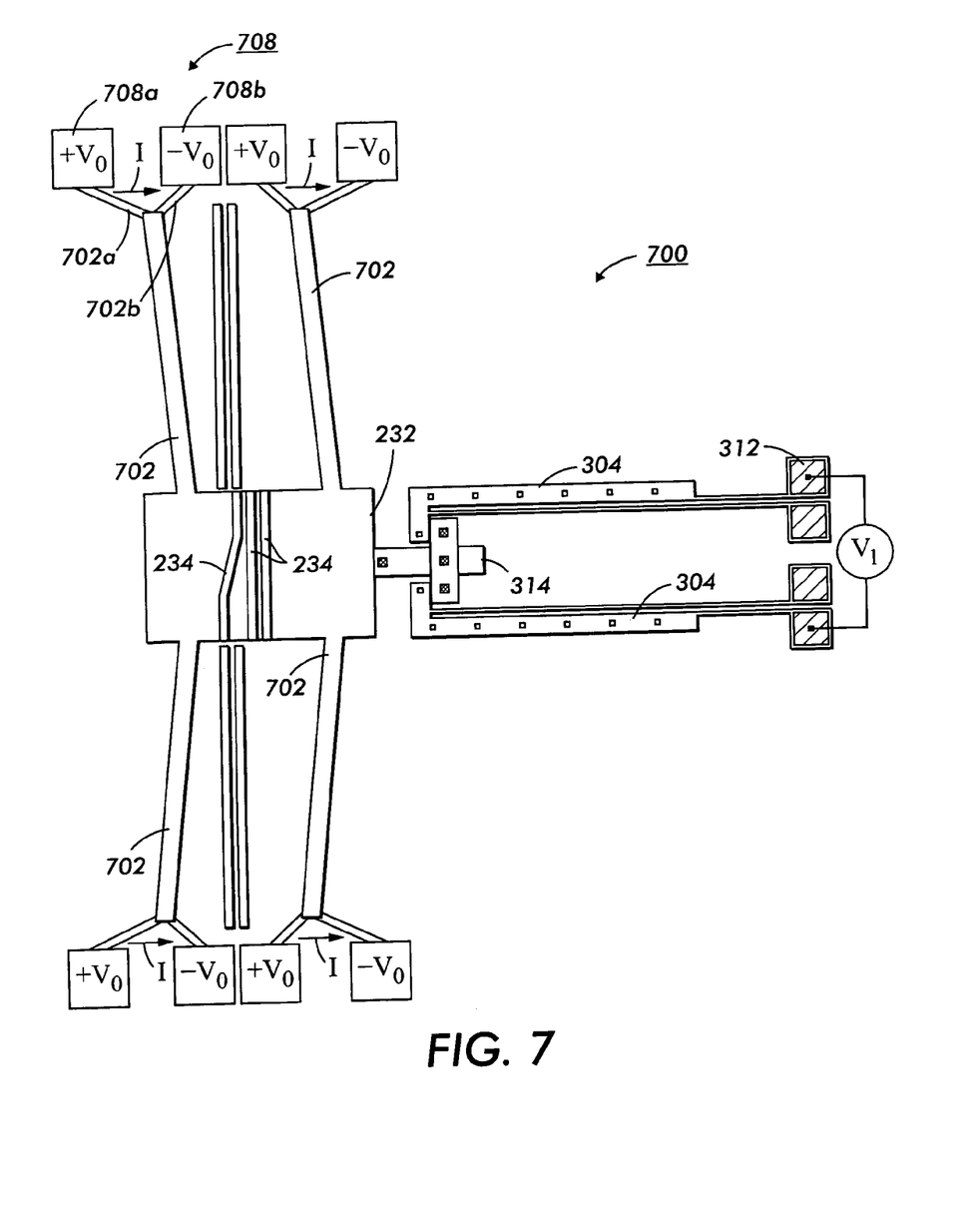
FIG. 7 is an exemplary diagram of a third embodiment of the optical shuttle system used in accordance with the invention.

FIG. 7 is an exemplary diagram of a third embodiment of the optical shuttle system used in accordance with the invention. As shown in FIG. 7, beams 702 are connected on one end of the electric terminals 708 through a first link 702a and a second link 702b. The other end of the beams 702 are connected to the shuttle 232. The electric terminals 708 include electric terminal pairs 708a and 708b for respective links 702a and 702b. The first and second links 702a and 702b can be composed of silicon and the beams 702 can be pre-shaped and can also be composed of silicon. Each group of electric terminals 708a and 708b may be configured so that one electric terminal 708a is a positive electric terminal and the other electric terminal 708b is a negative electric terminal. Accordingly, when power is applied to the beams 702 via the electric terminals 708a and 708b, electric current travels from the first link 702a to the second link 702b. Because the beams 702 are connected to the links 702a and 702b, thermal expansion occurs in the beams 702. Thus, the beams 702 drive the shuttle 232 to a predetermined position. Once the shuttle 232 is driven to the predetermined position, the shuttle 232 may be latched in place and subsequently returned to its equilibrium position using the process discussed above.

Because the embodiments of the invention do not use the combination of the springs, thermal actuators and the actuator head (as shown in the conventional shuttle device in FIGS. 3 and 4), and instead use, for example, the silicon beams as actuators and suspension arms, the optical shuttle systems of the invention do not have to overcome both a restoring force of the suspension arms, and thermal actuators as separate devices. Thus, high actuation forces and long displacement distances are not required in order to adequately drive the shuttle mechanism which results in the device using a lower power consumption than the conventional shuttle device. Moreover, the optical shuttle systems utilize minimal space within the switching system which reduces a tendency for out of plane deformation to occur within the optical switch.

If long beams are formed using silicon, less driving force is required to move the shuttle to a predetermined position as compared to short beams with the same cross-sectional area. Furthermore, a displacement of the shuttle can be increased by increasing the length of the beams and reducing an amount of electric current through the beams. The latch, shuttle and optical components of the optical shuttle system can be formed using a self-aligned lithographic process. Accordingly, the alignment between the shuttle waveguides and the stationary waveguides may be perfected in an x-y plane. The system performance of the optical shuttle systems of the invention may also be improved because thermal induced motion of the shuttle may be easily monitored using the electric current to control the beams.

Figure 8A:
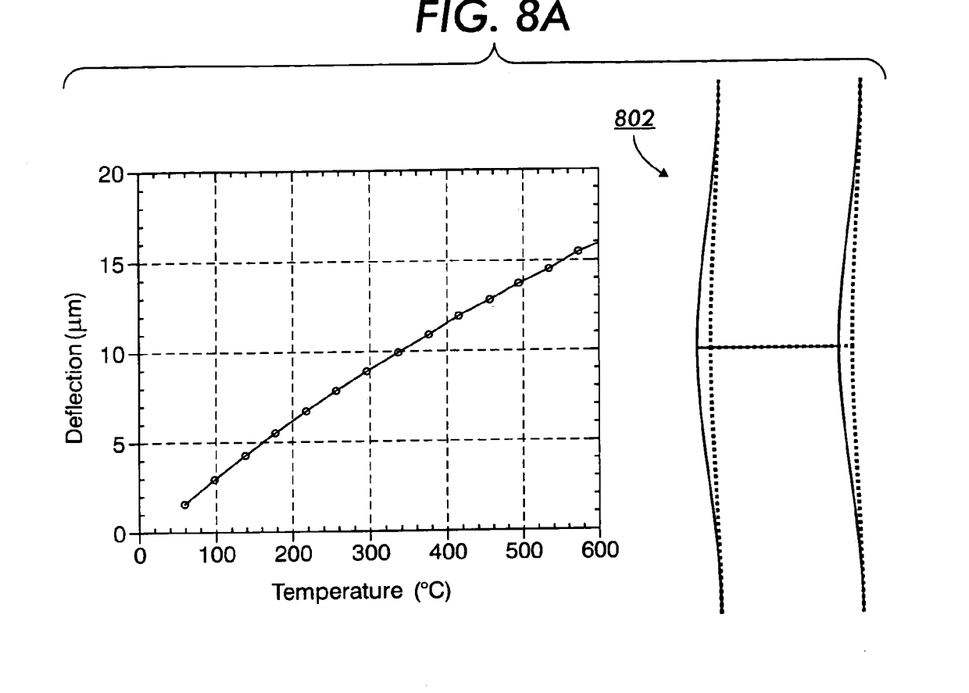
FIG. 8 is an exemplary graph showing deformation of the beams used with the optical shuttle system of the invention.
Figure 8B:
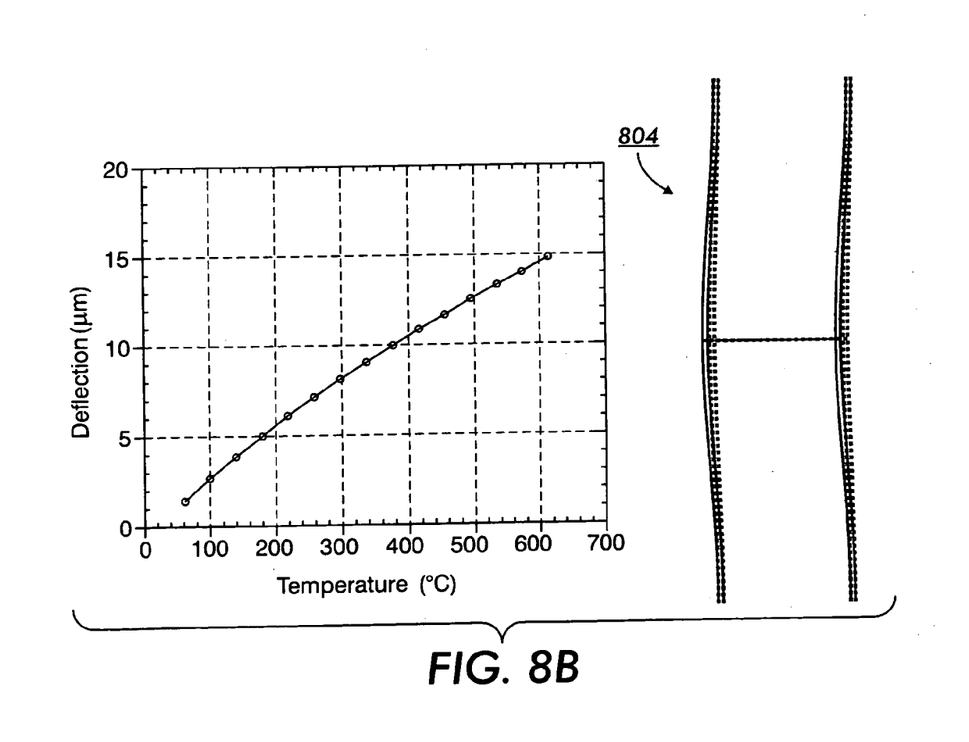

FIG. 8 is an exemplary graph showing deformation of the beams used with the optical shuttle systems of the invention. The graphs demonstrate the dependence of the shuttle displacement on temperature as electric current travels through the beams as discussed above. The beam configuration used to achieve the results in FIG. 8(a) included 4 silicon beams 802 with dimensions of 1200×2×3.5 µm$^3$. The beam configuration used to achieve the results in FIG. 8(b) included 8 silicon beams 804 with dimensions of 1200×2×3.5 µm$^3$. An ideal amount of deflection for the silicon beams is 14 µm, which can be successfully attained at temperatures between approximately 500° C. to 600° C. The results in FIGS. 8(a)–(b) show a non-linear dependence of the deflection of the beams on temperature. Axial stress or strain should be considered in determining the deflection of the beam because an exact analysis of the beam deformation cannot be determined by using beam deflection alone.

The optical switch systems and methods according to the invention may be fabricated, for example, by lithographically defining the beams to have a specified shape corresponding to a first state (or equilibrium state) of the beams. Any known lithographic technique may be used. Lithography allows the features of the beams, such as the shape and geometry, to be produced accurately.

Similarly, the geometry of the beams will define the second state of the beams (or non-equilibrium state). Thus, according to various exemplary embodiments of this invention, a fabrication method can include determining a second state of the beams in addition to the first state of the beams, by lithographically defining the beams to have a particular geometry. The particular geometry may include one or more of a predetermined length, a certain width, a certain height and a certain curvature. It should be understood that the height may also be defined by a thickness of a material layer in which the beam is fabricated.

Also, a predetermined geometry of the beams may be lithographically defined to determine various other features of the beams. For example, the geometry of the beams may be defined to determine a throw distance and/or a force curve of the beam. While other similar manufacturing techniques may be used, it may be advantageous to fabricate the entire system using the same technique, for example, simplifying the process by requiring less independent method steps.

As noted above, the optical switch may be lithographically defined by patterning in the device layer of a silicon-on-insulator wafer. The insulator layer between the device layer and the substrate may be partially etched to release, for example, the beams with part of the insulator layer remaining to anchor the beams to the substrate. The part of the insulator anchoring the beams may be patterned and etched to define the desired boundary condition for the beam.

An exemplary technique that is suitable for fabricating the beams is described in U.S. Pat. Nos. 6,379,989 and 6,362, 512 and US 2003/0210115, which are incorporated herein by reference in their entirety.

In general, polysilicon surface micromachining uses planar fabrication process steps common to the integrated circuit (IC) fabrication industry to manufacture microelectromechanical or micromechanical devices. The standard building-block process consists of depositing and photo-lithographically patterning alternating layers on a substrate. The alternating layers consist of low-stress polycrystalline silicon (also known as polysilicon) and a sacrificial material, such as silicon dioxide, on a substrate. Vias etched through the sacrificial layers provide anchor points to the substrate and between the polysilicon layers. The polysilicon layers are patterned to form mechanical elements of the micromachined device. The mechanical elements are thus formed layer-by-layer in a series of deposition and patterning process steps. The silicon dioxide layers are then removed by exposure to a selective etchant, such as hydrofluoric acid (HF), which does not attack the polysilicon layers. This releases the mechanical elements formed in the polysilicon layers for movement thereof.

While the invention has been described in conjunction with exemplary embodiment, these embodiments should be viewed as illustrative, not limiting. Various modifications, substitutes, or the like are possible within the spirit and scope of the invention.

What is claimed is:

1. An optical shuttle system for routing signals in a communications system, comprising:
    a terminal connected to a power source;
    a shuttle that includes waveguides used for routing the signals; and
    a plurality of beams composed of silicon, connected to corresponding electric terminals and connected to the shuttle so that the beams suspend the shuttle,
    a first group of the corresponding electric terminals being used as positive electric terminals so that electric current moves in a first direction toward the shuttle along the plurality of silicon beams connected to the positive electric terminals, and a second group of the corresponding electric terminals being used as negative electric terminals so that the electric current moves in a second direction away from the shuttle along the plurality of silicon beams connected to the negative electric terminals,
    each of the plurality of beams being pre-shaped, in an equilibrium state when no power is applied to the plurality of beams and in a non-equilibrium state when power is applied to the plurality of beams, each of the beams driving a movement of the shuttle when power from the power source is applied to the corresponding electric terminals.

2. The optical shuttle system of claim 1, the shuttle being driven in a direction substantially perpendicular to a longitudinal position of the plurality of beams when electric power is applied to the plurality of beams.

3. The optical shuttle system of claim 1, further comprising a latch that latches the shuttle after the beam drives the movement of the shuttle.

4. The optical shuttle system of claim 1, further comprising a plurality of silicon beams used to suspend the shuttle, the plurality of silicon beams being grouped into pairs of silicon beams connected to the shuttle and also connected to corresponding pairs of electric terminals, each pair of silicon beams being connected by a link.

5. The optical shuttle system of claim 1, further comprising a plurality of silicon beams used to suspend the shuttle, each of the plurality of silicon beams connected to the shuttle and also connected to middle part of a link that connects a first and a second electric terminal.

6. An optical shuttle system for routing signals in a communications system, comprising:
    a terminal connected to a power source;
    a shuttle that includes waveguides used for routing the signals; and
    a plurality of beams composed of silicon and connected to the shuttle so that the beams suspend the shuttle, the plurality of silicon beams being grouped into pairs of silicon beams connected to corresponding pairs of electric terminals, each pair of silicon beams being connected by a link, one of the electric terminals in the pairs of electric terminals being a positive electric terminal so that electric current moves towards the shuttle along one of the silicon beams of the pairs of silicon beams, and another one of the electric terminals in the pairs of electric terminals being a negative terminal so that electric current moves away from the shuttle along another one of the silicon beams of the pairs of silicon beams, each of the pairs of silicon beams driving a movement of the shuttle when power from the power source is applied to the corresponding pairs of electric terminals.

7. An optical shuffle system for routing signals in a communications system, comprising:
    a terminal connected to a power source;
    a shuttle that includes waveguides used for routing the signals; and
    a plurality of beams composed of silicon, connected to corresponding electric terminals and connected to the shuttle so that the beams suspend the shuttle, each of the plurality of silicon beams also connected to middle part of a link that connects a first electric terminal and a second electric terminal, the first electric terminal being a positive electric terminal, and the second electric terminal being a negative electric terminal so that when electric power is applied from a power source to the first and second electric terminals, an electric current moves along the link and causes the plurality of silicon beams to drive the shuttle in a direction substantially perpendicular to a direction of the plurality of silicon beams.

8. A method of using an optical shuttle system for routing signals in a communications system, comprising:
    connecting a terminal to a power source;
    connecting a shuttle that includes waveguides used for routing the signals to a plurality of silicon beams so that the beams suspend the shuttle;
    connecting each of the plurality of silicon beams to corresponding electric terminals; and applying power from the power source to at least one of the corresponding terminals so that the corresponding beam drives a movement of the shuttle in a direction substantially perpendicular to a direction of the beam, each of the plurality of silicon beams being pre-shaped, in an equilibrium state when no power is applied to the plurality of beams, and in a non-equilibrium state when power is applied to the plurality of beams, using a first group of the corresponding electric terminals as positive electric terminals so that electric current moves in a first direction toward the shuttle along the plurality of silicon beams connected to the positive electric terminals, and using a second group of the corresponding electric terminals as negative electric terminals so that the electric current moves in a second direction away from the shuttle along the plurality of silicon beams connected to the negative electric terminals.

9. The method of using the optical shuttle system of claim 8, further comprising driving the shuttle in a direction substantially perpendicular to a longitudinal position of the plurality of beams when electric power is applied to the plurality of beams.

10. The method of using the optical shuttle system of claim 8, further comprising latching the shuttle after the beam drives the movement of the shuttle.

11. The method of using the optical shuttle system of claim 8, further comprising:
grouping the plurality of silicon beams into pairs of silicon beams that are connected to the shuttle;
connecting the pairs of silicon beams to corresponding pairs of electric terminals, each pair of silicon beams being connected by a link.

12. The method of using the optical shuffle system of claim 8, further comprising:
connecting each of the plurality of silicon beams to the shuttle so that the shuttle is suspended by the plurality of silicon beams;
connecting each of the plurality of silicon beams to a middle part of a link; and
connecting the plurality of silicon beams to a first and a second electric terminal.

13. A method of using an optical shuttle system for routing signals in a communications system, comprising:
connecting a terminal to a power source;
connecting a shuttle that includes waveguides used for routing the signals to a plurality of silicon beams so that the beams suspend the shuttle;
grouping the plurality of silicon beams into pairs of silicon beams that are connected to the shuttle;
connecting the pairs of silicon beams to corresponding pairs of electric terminals, each pair of silicon beams being connected by a link; and
applying power from the power source to at least one of the corresponding pairs of electric terminals so that the corresponding pair of silicon beams drives a movement of the shuttle in a direction substantially perpendicular to a direction of the pair of silicon beams, using one of the electric terminals in the pairs of electric terminals as a positive electric terminal and using another one of the electric terminals in the pairs of electric terminals as a negative terminal so that electric current moves toward the shuttle along one of the silicon beams of the pair of silicon beams, and so that electric current moves away from the shuttle along another one of the silicon beams of the pair of silicon beams.

14. A method of using an optical shuttle system for routing signals in a communications system, comprising:
connecting a terminal to a power source;
connecting a shuttle that includes waveguides used for routing the signals to a plurality of silicon beams so that the plurality of silicon beams suspend the shuttle;
connecting each of the plurality of silicon beams to a middle part of a link; and
connecting each of the plurality of silicon beams to a first corresponding electric terminal and a second corresponding electric terminal; and
applying power from the power source to at least one of the corresponding terminals using the first electric terminal as a positive electric terminal and using the second electric terminal as a negative electric terminal so that an electric current moves along the link and causes the plurality of silicon beams to drive the shuttle in a direction substantially perpendicular to a direction of the plurality of silicon beams.

* * * * *